United States Patent [19]

Plavac

[11] Patent Number: 4,631,070

[45] Date of Patent: Dec. 23, 1986

[54] GLYCIDOL MODIFIED SUCCINIMIDES AND FUEL COMPOSITIONS CONTAINING THE SAME

[75] Inventor: Frank Plavac, Novato, Calif.

[73] Assignee: Chevron Research Company, San Francisco, Calif.

[21] Appl. No.: 870,066

[22] Filed: Jun. 3, 1986

Related U.S. Application Data

[62] Division of Ser. No. 673,962, Nov. 21, 1984.

[51] Int. Cl.$^4$ .......................... C10L 1/18; C10L 1/22
[52] U.S. Cl. .......................................... 44/63; 44/71; 44/72
[58] Field of Search ............... 44/72, 71, 63; 548/545; 252/51.5 A

[56] References Cited

U.S. PATENT DOCUMENTS

| | | | |
|---|---|---|---|
| 3,272,746 | 9/1966 | Le Suer et al. | 252/51.5 A |
| 3,367,943 | 2/1968 | Miller et al. | 260/326.3 |
| 3,373,111 | 3/1968 | Le Suer et al. | 252/51.5 A |
| 4,375,974 | 3/1983 | Maldonado et al. | 44/63 |
| 4,422,856 | 12/1983 | Maldonado et al. | 44/71 |
| 4,581,038 | 4/1986 | Hoke | 44/63 |

Primary Examiner—Jacqueline V. Howard
Attorney, Agent, or Firm—S. R. LaPaglia; R. C. Gaffney; G. F. Swiss

[57] ABSTRACT

Disclosed are additives which are useful as dispersants in lubricating oils, gasolines, marine crankcase oils and hydraulic oils. In particular, disclosed are alkenyl or alkyl succinimides which have been modified by treatment with glycidol.

19 Claims, No Drawings

GLYCIDOL MODIFIED SUCCINIMIDES AND FUEL COMPOSITIONS CONTAINING THE SAME

This is a division of application Ser. No. 673,962 filed Nov. 21, 1984.

BACKGROUND OF THE INVENTION

1. Field of the Invention

This invention relates to additives which are useful as dispersants and detergents in lubricating oils. In particular, this invention is directed toward alkenyl or alkyl succinimides which have been modified by treatment with glycidol. These modified alkenyl or alkyl succinimides are improved dispersants for lubricating oil over the alkylene oxide modified succinimides. The modified succinimides of this invention are also useful as detergents and dispersants in fuels.

2. Prior Art

Modification of alkenyl or alkyl succinimides with alkylene oxides such as ethylene oxide, propylene oxide and epichlorohydrin to produce poly(oxyalkylene) hydroxy derivatives thereof are taught in U.S. Pat. No. 3,373,111 and in U.S. Pat. No. 3,367,943. These alkylene oxide treated succinimides are taught as additives for lubricating oils. It has now been found that treatment of alkenyl or alkyl succinimides with glycidol significantly improves the dispersancy property of the succinimide as compared to alkenyl or alkyl succinimides treated with alkylene oxides.

SUMMARY OF THE INVENTION

Accordingly, the present invention relates to a product prepared by the process which comprises contacting, at a temperature sufficient to cause reaction, an alkenyl or alkyl succinimide with glycidol.

As noted above, the modified alkenyl or alkyl succinimides of this invention possess dispersancy and detergency properties when used in either lubricating oils or fuels. Thus, another aspect of this invention is a lubricating oil composition comprising a major amount of an oil of lubricating viscosity and an amount of a modified alkyl or alkenyl succinimide sufficient to provide dispersancy and detergency.

In still another aspect of this invention is a fuel composition comprising a major portion of a hydrocarbon boiling in a gasoline range and an amount of a modified alkyl or alkenyl succinimide sufficient to provide dispersancy and detergency.

DETAILED DESCRIPTION OF THE INVENTION

The modified alkenyl or alkyl succinimides of this invention are prepared by reaction of an alkenyl or alkyl succinimide with glycidol. The reaction is conducted at a temperature sufficient to cause reaction of the glycidol with the alkenyl or alkyl succinimide. In particular, reaction temperatures of from about 0° C. to about 250° C. are preferred with temperatures of from about 100° C. to 200° C. being most preferred.

The reaction may be conducted neat—that is, both the alkenyl or alkyl succinimide and the glycidol are combined in the proper ratio, either alone or in the presence of a catalyst, such as an acidic, basic or Lewis acid catalyst, and then stirred at the reaction temperature. Examples of suitable catalysts include, for instance, boron trifluoride, alkane sulfonic acid, alkali or alkaline carbonate.

Alternatively, the reaction may be conducted in a diluent. For example, the reactants may be combined in a solvent such as toluene, xylene, oil or the like, and then stirred at the reaction temperature. After reaction completion, volatile components may be stripped off. When a diluent is employed, it is preferably inert to the reactants and products formed and is generally used in an amount sufficient to insure efficient stirring.

Water, which can be present in the alkenyl or alkyl succinimide, may be removed from the reaction system either before or during the course of the reaction via azeotroping or distillation. After reaction completion, the system can be stripped at elevated temperatures (100° C. to 250° C.) and reduced pressures to remove any volatile components which may be present in the product.

Another embodiment of the above process is a continuous flow system in which the alkenyl or alkyl succinic anhydride and polyamine are added at the front end of the flow while the glycidol is added further downstream in the system.

Mole ratios of the glycidol to the basic amine nitrogen of the alkenyl or alkyl succinimide employed in the process of this invention are generally in the range of from about 0.2:1 to about 10:1, although preferably from about 0.5:1 to about 5:1 and most preferably 1:1 to 3:1.

The reaction is generally complete from within 0.5 to 10 hours.

A. ALKENYL OR ALKYL SUCCINIMIDES

The alkenyl or alkyl succinimides that can be used to prepare the lubricating oil additives described herein are disclosed in numerous references and are well known in the art. Certain fundamental types of succinimides and related materials encompassed by the term of art "succinimide" are taught in U.S. Pat. Nos. 3,018,291; 3,100,673; 3,219,666; 3,172,892; and 3,272,746, the disclosures of which are hereby incorporated by reference. The term "succinimide" is understood in the art to include many of the amide, imide and amidine species which are also formed by this reaction. The predominant product however is succinimide and this term has been generally accepted as meaning the product of a reaction of an alkenyl substituted succinic acid or anhydride with a polyamine. As used herein, included within this term are the alkenyl or alkyl mono-, bis-succinimides and other higher analogs.

A(1) Succinic Anhydride

The preparation of the alkenyl-substituted succinic anhydride by reaction with a polyolefin and maleic anhydride has been described, e.g., U.S. Pat. Nos. 3,018,250 and 3,024,195. Such methods include the thermal reaction of the polyolefin with maleic anhydride and the reaction of a halogenated polyolefin, such as a chlorinated polyolefin, with maleic anhydride. Reduction of the alkenyl-substituted succinic anhydride yields the corresponding alkyl derivative. Alternatively, the alkenyl substituted succinic anhydride may be prepared as described in U.S. Pat. Nos. 4,388,471 and 4,450,281 which are totally incorporated herein by reference.

Polyolefin polymers for reaction with the maleic anhydride are polymers comprising a major amount of $C_2$ to $C_5$ mono-olefin, e.g., ethylene, propylene, butylene, isobutylene and pentene. The polymers can be homopolymers such as polyisobutylene as well as copolymers of 2 or more such olefins such as copolymers of: ethylene and propylene, butylene, and isobutylene, etc. Other copolymers include those in which a minor amount of the copolymer monomers, e.g., 1 to 20 mole percent is a $C_4$ to $C_8$ nonconjugated diolefin, e.g., a copolymer of isobutylene and butadiene or a copolymer of ethylene, propylene and 1,4-hexadiene, etc.

The polyolefin polymer usually contains from about 10 to 300 carbon atoms, although preferably 10 to 200 carbon atoms and most preferably 20 to 100 carbon atoms.

A particularly preferred class of olefin polymers comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene which may or may not be incorporated in the polymer. Most often the isobutene units constitute 80%, preferably at least 90%, of the units in the polymer. These polybutenes are readily available commercial materials well-known to those skilled in the art. Disclosures thereof will be found, for example, in U.S. Pat. Nos. 3,215,707; 3,231,587; 3,515,669; and 3,579,450, as well as U.S. Pat. No. 3,912,764. The above are incorporated by reference for their disclosures of suitable polybutenes.

In addition to the reaction of a polyolefin with maleic anhydride, many other alkylating hydrocarbons may likewise be used with maleic anhydride to produce alkenyl succinic anhydride. Other suitable alkylating hydrocarbons include cyclic, linear, branched and internal or alpha olefins with molecular weights in the range of 100–4,500 or more with molecular weights in the range of 200–2,000 being more preferred. For example, alpha olefins obtained from the thermal cracking of paraffin wax. Generally, these olefins range from 5–20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica.

A(2) Polyamine

The polyamine employed to prepare the alkenyl or alkyl succinimides is preferably derived from a polyamine having from 2 to about 12 amine nitrogen atoms and from 2 to about 40 carbon atoms. The polyamine is reacted with an alkenyl or alkyl succinic anhydride to produce the alkenyl or alkyl succinimide, employed in this invention. The polyamine is so selected so as to provide at least one basic amine per succinimide. Since the reaction of the alkenyl or alkyl succinimide with glycidol employed in this invention is believed to proceed through a secondary or primary amine, at least one of the basic amine atoms of the alkenyl or alkyl succinimide must either be a primary amine or a secondary amine. Accordingly, in those instances in which the succinimide contains only one basic amine, that amine must either be a primary amine or a secondary amine. The polyamine preferably has a carbon-to-nitrogen ratio of from about 1:1 to about 10:1.

The polyamine portion of the alkenyl or alkyl succinimide may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the amines of the polyamine is hydrogen, e.g., at least one of the basic nitrogen atoms of the polyamine is a primary or secondary amino nitrogen atom.

Hydrocarbyl, as used in describing the polyamine components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxyisopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2ethoxyethoxy)hexyl, etc. The acyl groups of the aforementioned (C) substituents are such as propionyl, acetyl, etc. The more preferred substituents are hydrogen, $C_1$–$C_6$ alkyls and $C_1$–$C_6$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and polysubstituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl and hydroxyalkyl-substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene, trimethylene, 1,3,2-hydroxypropylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydroxy- and hydrocarbyl-substituted polyamines. Among the polyalkylene polyamines, those containing 2–12 amine nitrogen atoms and 2–24 carbon atoms are especially preferred, and the $C_2$–$C_5$ alkylene polyamines are most preferred, in particular, the lower polyalkylene polyamines, e.g., ethylene diamine, dipropylene triamine, etc.

The polyamine component also may contain heterocyclic polyamines, heterocyclic substituted amines and substituted heterocyclic compounds, wherein the heterocycle comprises one or more 5–6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, N-(2-hydroxyethyl)-piperazine, 1,2-bis-(N-piperazinyl)ethane, and N,N'-bis(N-piperazinyl)piperazine, 2-methylimidazoline, 3-aminopiperidine, 2-aminopyridine, 2-(3-aminoethyl)-3-pyrroline, 3-aminopyrrolidine, N-(3-aminopropyl)-mortpholine, etc. Among the heterocyclic compounds, the piperazines are preferred.

Typical polyamines that can be used to form the compounds of this invention include the following: ethylene diamine, 1,2-propylene diamine, 1,3-propylene diamine, diethylene triamine, triethylene tetramine, hexamethylene diamine, tetraethylene pentamine, methylaminopropylene diamine, N-(betaaminoethyl)piperazine, N,N'-di(betaaminoethyl)piperazine, N,N'-di(-beta-aminoethyl)imidazolidone-2, N-(beta-cyanoethyl)ethane-1,2-diamine, 1,3,6,9-tetraaminooctadecane, 1,3,6-triamino-9-oxadecane, N-(beta-aminoethyl)diethanolamine, N'-acetyl-N'-methyl-N-(beta-aminoethyl)-ethane-1,2-diamine, N-methyl-1,2-propanediamine, N-(betanitroethyl)-1,3-propane diamine, 5-(beta-aminoethyl)-1,3,5-dioxazine, 2-(2-aminoethylamino)-ethanol,2-[2-(2-aminoethylamino)ethylamino]-ethanol.

Another group of suitable polyamines are the propyleneamines, (bisaminopropylethylenediamines). Propyleneamines are prepared by the reaction of acrylonitrile with an ethyleneamine, for example, an ethyleneamine having the formula $H_2N(CH_2CH_2NH)_ZH$ wherein Z is an integer from 1 to 5, followed by hydrogenation of the resultant intermediate. Thus, the product prepared from ethylene diamine and acrylonitrile would be $H_2N(CH_2)_3NH(CH_2)_2NH(CH_2)_3NH_2$.

In many instances the polyamine used as a reactant in the production of succinimides of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine. Finally, in preparing the succinimide for use in this invention, where the various nitrogen atoms of the polyamine are not geometrically equivalent, several substitutional isomers are possible and are encompassed within the final product. Methods of preparation of polyamines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volumes 2, pp. 99–116.

The reaction of a polyamine with an alkenyl or alkyl succinic anhydride to produce the alkenyl or alkyl succinimides is well known in the art and is disclosed in U.S. Pat. Nos. 2,992,708; 3,018,291; 3,024,237; 3,100,673; 3,219,666; 3,172,892 and 3,272,746. The above are incorporated herein by reference for their disclosures of preparing alkenyl or alkyl succinimides.

As noted above, the term "alkenyl or alkyl succinimide" refers to both the alkenyl or alkyl mono- and bis-succinimides and to the higher analogs of alkenyl or alkyl poly succinimides. Preparation of the bis- and higher analogs may be accomplished by controlling the molar ratio of the reagents. For example, a product comprising predominantly mono- or bis-succinimide can be prepared by controlling the molar ratios of the polyamine and succinic anhydride. Thus, if one mole of polyamine is reacted with one mole of an alkenyl or alkyl substituted succinic anhydride, a predominantly mono-succinimide product will be prepared. If two moles of an alkenyl or alkyl substituted succinic anhydride are reacted per mole of polyamine, a bis-succinimide is prepared. Higher analogs may likewise be prepared.

A particularly preferred class of alkenyl or alkyl succinimides employed in the process of the instant invention may be represented by Formula II:

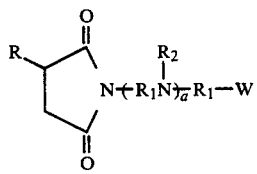

wherein R is alkenyl or alkyl of from 10 to 300 carbon atoms; $R_1$ is alkylene of 2 to 10 carbon atoms; $R_2$ is hydrogen or lower alkyl; a is an integer from 0 to 10; and W is $-NH_2$ or represents a group of Formula III:

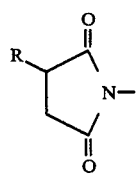

wherein R is alkenyl or alkyl of from 10 to 300 carbon atoms; with the proviso that when W is the group of Formula III above, then a is not zero and at least one of $R_2$ is hydrogen.

As indicated above, the polyamine employed in preparing the succinimide is a mixture of different compounds. Accordingly, in Formula II each value of $R_1$ and $R_2$ may be the same as or different from other $R_1$ and $R_2$.

Preferably $R_1$ is alkylene of 2 to 6 carbon atoms and most preferably is either ethylene or propylene.

Preferably, $R_2$ is hydrogen.

Preferably, a is an integer from 1 to 6.

The alkenyl or alkyl succinimides of Formula II above are generally prepared from the reaction of an alkylene polyamine with an alkenyl or alkyl succinic anhydride.

The alkylene polyamines employed in this reaction are generally represented by the formula:

$$H_2N(R_1NH)_x-R_1NH_2 \qquad \text{IV}$$

wherein $R_1$ is an alkylene moiety of 2 to 10 carbon atoms and x is an integer from about 0 to 10. However, the preparation of these alkylene polyamines do not produce a single compound and cyclic heterocycles, such as piperazine, may be included to some extent in the alkylene diamines of Formula IV.

B. Glycidol

Glycidol is a commercially available reagent of the formula:

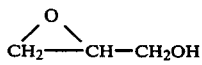     I

Also, glycidol may be prepared from glycerol-1-monochlorohydrin by the action of potassium hydroxide in alcohol. For example, see Rider et al., JACS, 52, 1521 (1930).

C. Glycidol Modified Succinimides

Glycidol, I, reacts with a basic primary or secondary amine of the succinimide, V, to produce either or both a 2,3-dihydroxy-1-propylamine, VI, or a 1,3-dihydroxy-2-propylamine, VII, as shown in reaction (1) below:

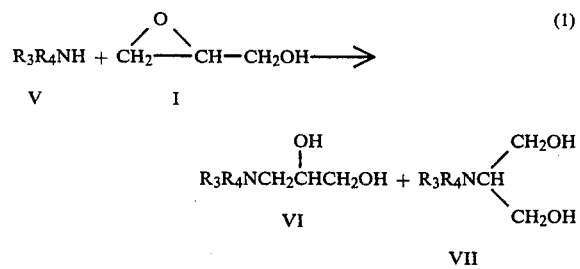

wherein $R_3$ and $R_4$ complete an alkenyl or alkyl succinimide.

Since amines possess greater nucleophilicity than hydroxy groups, additional amounts of glycidol will first react with all of the available primary and secondary amines of the succinimide converting these to 2,3-dihydroxy-1-propylamine derivatives or to 1,3-dihydroxy-2-propylamine derivatives. Accordingly, by employing a charge mole ratio of 1 or less of glycidol to each of the basic nitrogens of the polyamino moiety of the succinimide, the resulting product is a polyamino alkenyl or alkyl substituted succinimide wherein one or more of the basic nitrogens of the polyamino moiety is substituted with either a 2,3-dihydroxy-1-propyl or a 1,3-dihydroxy-2-propyl group.

In general, 2,3-dihydroxy-1-propyl derivatives are the result of nucleophilic ring opening of the epoxide group of glycidol; whereas, 1,3-dihydroxy-2-propyl derivatives are the result of electrophilic ring opening of the epoxide group of glycidol. Actual product formation from this reaction is generally a mixture of both the 2,3-dihydroxy-1-propyl and the 1,3-dihydroxy-2-propyl with the predominant product depending upon numerous factors such as solvent, catalyst and other factors well known in the art. For instance, an acid catalyst, such as p-toluene sulfonic acid, hydrogen chloride, boron trifluoride, etc., facilitates electrophilic ring opening resulting in the predominant formation of the 1,3-dihydroxy-2-propyl group. On the other hand, basic conditions favor nucleophilic ring opening which results in predominant formation of the 2,3-dihydroxy-1-propyl group. Since the polyamino moiety of the alkenyl or alkyl succinimide contains basic nitrogen(s), thermal reaction of the glycidol with an alkenyl or alkyl succinimide, either neat or in the presence of diluent, favors nucleophilic ring opening of the epoxide group of glycidol.

As the charge mole ratio of glycidol to the basic nitrogen(s) of the alkenyl or alkyl succinimide exceeds 1, excess glycidol then reacts with the hydroxy groups of either the 2,3-dihydroxy-1-propyl or the 1,3-dihydroxy-2propyl groups resulting in a mixture of several products. The identity of these products are dependent on factors such as either nucleophilic or electrophilic epoxide ring opening; polymerization; addition to either the primary (more likely) or secondary (less likely) hydroxy group of the 2,3-dihydroxy-1-propyl group; etc.

In any event, the product resulting from addition of glycidol at a charge mole ratio of from greater than 1 and up to 10 of glycidol to each of the basic nitrogen of the alkenyl or alkyl succinimide yields a product possessing dispersancy in lubricating oil. A particularly preferred product is prepared at a charge mole ratio of from greater than 1 up to 5 and most preferably at a charge mole ratio of 3.

Also, as is apparent, in preparing the glycidol modified succinimide wherein more than 1 equivalent of glycidol per basic nitrogen is employed, either a dilute solution of glycidol or slow addition of glycidol to the reaction system may be employed to minimize self-polymerization of the glycidol.

The modified alkenyl or alkyl succinimides of this invention can be reacted with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified succinimide may be employed.

The modified alkenyl or alkyl succinimides of this invention are useful as detergent and dispersant additives when employed in lubricating oils. When employed in this manner, the modified alkenyl or alkyl succinimide additive is usually present in from 0.2 to 10 percent by weight to the total composition and preferably at about 0.5 to 5 percent by weight. The lubricating oil used with the additive compositions of this invention may be mineral oil or synthetic oils of lubricating viscosity and preferably suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Additive concentrates are also included within the scope of this invention. The concentrates of this invention usually include from about 90 to 10 weight percent of an oil of lubricating viscosity and from about 10 to 90 weight percent of the complex additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives which may be present in the formulation include rust inhibitors, foam inhibitors, corrosion inhibitors, metal deactivators, pour point depressants, antioxidants, and a variety of other wellknown additives.

It is also contemplated the modified succinimides of this invention may be employed as dispersants and detergents in hydraulic fluids, marine crankcase lubricants and the like. When so employed, the modified succinimide is added at from about 0.1 to 10 percent by weight to the oil. Preferably, at from 0.5 to 5 weight percent.

When used in fuels, the proper concentration of the additive necessary in order to achieve the desired detergency is dependent upon a variety of factors including the type of fuel used, the presence of other detergents or dispersants or other additives, etc. Generally, however, and in the preferred embodiment, the range of concentration of the additive in the base fuel is 10 to 10,000 weight parts per million, preferably from 30 to 2,000 weight parts per million, and most preferably from 30 to 700 parts per million of the modified succinimide per part of base fuel. If other detergents are present, a lesser amount of the modified succinimide may be used.

The modified succinimide additives of this invention may be formulated as a fuel concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the amount of the additive will be ordinarily at least 10 percent by weight and generally not exceed 70 percent by weight and preferably from 10 to 25 weight percent.

The following examples are offered to specifically illustrate this invention. These examples and illustrations are not to be construed in any way as limiting the scope of this invention.

EXAMPLES

EXAMPLE 1

To a flask equipped with a stirrer and nitrogen inlet, was charged 50 g of a succinimide dispersant composition [prepared by reacting 1 equivalent of polyisobutenyl succinic anhydride, where the polyisobutenyl group has a number average weight of about 950, with 0.87 equivalents of tetraethylenepentaamine then diluted to about 40 to 50% actives in diluent oil and having an AV=51.5 and containing 2.14% N] and 1.85 g of glycidol. The mixture was heated at 150° C. for 3 hours and then cooled to yield a glycidol modified succinimide having an AV=49 and containing 2.08% N.

EXAMPLE 2

To a flask equipped with a stirrer and nitrogen inlet, was charged 50 g of the succinimide of Example 1 and 3.7 g glycidol. The mixture was heated at 150° C. for 3 hours and then cooled to yield a glycidol modified succinimide containing 2.01% N.

EXAMPLE 3

To a flask equipped with a stirrer and nitrogen inlet, was charged 50 g of the succinimide of Example 1 and 7.4 g glycidol. The mixture was heated at 150° C. for 3 hours and then cooled to yield a glycidol modified succinimide containing 1.92% N.

EXAMPLE 4

To a flask equipped with a stirrer and nitrogen inlet, was charged 50 g of the succinimide of Example 1 and 18.5 g glycidol. The mixture was heated at 150° C. for 3 hours and then cooled to yield a glycidol modified succinimide containing 1.60% N.

EXAMPLE 5

To a flask equipped with a stirrer and nitrogen inlet, was charged 463.6 g of a bis-succinimide [prepared by reacting 1 equivalent of polyisobutenyl succinic anhydride, where the polyisobutenyl group has a number average MW of about 950, with 0.5 mole of tetraethylenepentaamine then diluted to about 40 to 50% actives in diluent oil and having an AV=29.7 and containing 1.51% N] and 22.2 g glycidol. The mixture was heated at 150° C. for 5 hours and then cooled to yield a glycidol modified bis-succinimide having an AV=28.7 and containing 1.42% N.

EXAMPLE 6

To a flask equipped with a stirrer and nitrogen inlet, was charged 44.4 g of glycidol and 463.6 g of the bis-succinimide composition of Example 5. The mixture was heated at 150° C. for 5 hours and then cooled to yield a glycidol modified bis-succinimide containing 1.36% N.

EXAMPLE 7

To a flask equipped with a stirrer and nitrogen inlet, was charged 66.6 g of glycidol and 463.6 g of the bis-succinimide composition of Example 5. The mixture was heated at 150° C. for 5 hours. The system was then stripped of volatiles (0.4 g) by heating at 110° C. under reduced pressure to yield a glycidol modified bis-succinimide containing 1.34% N.

EXAMPLE 8

To a flask equipped with a stirrer and nitrogen inlet, was charged 1854.4 g of the bis-succinimide composition of Example 5 and 266.4 g of glycidol. The mixture was heated at 150° C. for 5 hours to yield a glycidol modified bis-succinimide containing 1.36% N.

EXAMPLE 9

To an autoclave was charged 700 g of the bissuccinimide composition of Example 5 and 36.5 g of ethylene oxide. The mixture was heated at 180° C. for 2 hours to yield a product containing 1.34% N.

EXAMPLE 10

To an autoclave was charged 400 g of the bissuccinimide composition of Example 5 and 40.9 g of ethylene oxide. The mixture was heated at 180° C. for 2 hours to yield a product containing 1.30% N.

A formulated oil containing a glycidol modified succinimide of the invention was compared to an ethylene oxide modified succinimide in a Sequence V-D Test method (according to candidate test for ASTM). This procedure utilizes a Ford 2.3-liter, four-cylinder Pinto engine. The test method simulates a type of severe field test service characterized by a combination of low speed, low temperature "stop and go" city driving and moderate turnpike operation. The effectiveness of the additives in the oil is measured in terms of the protection against sludge and varnish deposits on a 0 to 10 scale with 0 being black and 10 indicating no varnish or sludge deposits. The result is indicated in Table I below.

The comparisons were made in a formulated base oil Exxon 150N 10W40 containing a succinimide dispersant, 20 mmoles of an overbased calcium phenate, 30 mmoles as a calcium sulfonate, 0.16% zinc as primary alkyl zinc dithiophosphate, and a nondispersant ethylene-propylene copolymer VI improver to give an SAE 10W40 oil.

TABLE I

| Formulation Contained 6% Succinimide of Example[1] | Average Varnish[2] |
| --- | --- |
| Example 8 | 7.2 |
| Example 9 | 5.9 |
| Untreated Bis-Succinimide Composition of Example 5 | 5.4 |

[1]50% actives in oil gives a 3% concentration of actives.
[2]Average of two runs.

What is claimed is:

1. A fuel composition comprising a hydrocarbon boiling in the gasoline range and from 10 to 10,000 parts per million of a product produced by the process which comprises contacting at a temperature sufficient to cause reaction an alkenyl or alkyl succinimide containing at least one primary or secondary amine with glycidol wherein the charge mole ratio ranges from greater than 1 and up to 10 of glycidol to each of the basic nitrogens of the alkenyl or alkyl succinimide.

2. A fuel composition as defined in claim 1 wherein the alkenyl or alkyl group of the alkenyl or alkyl succinimide contains from 20 to 100 carbon atoms.

3. A fuel composition as defined in claim 2 wherein the process is conducted at from 0° to 250° C.

4. A fuel composition as defined in claim 3 wherein the charge mole ratio ranges from greater than 1 and up to 5 of glycidol to each of the basic nitrogens of the alkenyl or alkyl succinimide.

5. A fuel composition comprising a hydrocarbon boiling in the gasoline range and from 10 to 10,000 parts per million of a compound produced by the process which comprises contacting at a temperture sufficient to cause reaction glycidol with an alkenyl or alkyl succinimide of the formula:

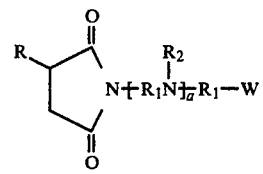

wherein R is an alkenyl or alkyl group containing from about 10 to 300 carbon atoms; $R_1$ is alkylene of 2 to 10 carbon atoms; $R_2$ is hydrogen or lower alkyl; a is an integer from 0 to 10; and W is $-NH_2$ or

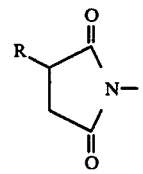

wherein R is an alkenyl or alkyl group containing from about 10 to 300 carbon atoms; with the proviso that if W is

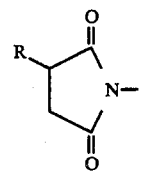

then a is not zero and at least one $R_2$ is hydrogen and wherein the charge mole ratio ranges from greater than 1 and up to 10 of glycidol to each of the basic nitrogens of the alkenyl or alkyl succinimide.

6. A fuel composition as defined in claim 5 wherein $R_2$ is hydrogen.

7. A fuel composition as defined in claim 6 wherein $R_1$ is either ethylene or propylene and W is $-NH_2$.

8. A fuel composition as defined in claim 7 wherein a is either 2 or 3.

9. A fuel composition as defined in claim 8 wherein R is an alkenyl or alkyl group of from 20 to 100 carbon atoms.

10. A fuel composition as defined in claim 9 wherein the process is conducted at from 0° to 250° C.

11. A fuel composition as defined in claim 10 wherein the charge mole ratio ranges from greater than 1 and up to 5 of glycidol to each of the basic nitrogens of the alkenyl or alkyl succinimide.

12. A fuel composition comprising a hydrocarbon boiling in the gasoline range and from 10 to 10,000 parts per million of a product produced by the process which comprises:
  (a) contacting at a temperature sufficient to cause reaction an alkenyl or alkyl succinimide containing at least one primary or secondary amine with glycidol wherein the charge mole ratio ranges from greater than 1 and up to 10 of glycidol to each of the basic nitrogens of the alkenyl or alkyl succinimide; and
  (b) reacting the adduct formed in (a) above with boric acid wherein from about 0.1 equivalents to 10 equivalents of boric acid are employed perequivalent of adduct produced in (a) above.

13. A fuel concentrate comprising from 30 to 90 weight percent of an inert stable oleophilic orgain solvent and 10 to 70 weight percent of a product produced by the process which comprises contacting at a temperature sufficient to cause reaction an alkenyl or alkyl succinimide containing at least one primary or secondary amine with glycidol wherein the charge mole ratio ranges from greater than 1 and up to 10 of glycidol to each of the basic nitrogens of the alkenyl or alkyl succinimide.

14. A fuel concentrate as defined in claim 13 wherein the alkenyl or alkyl group of the alkenyl or alkyl succinimide contains from 20 to 100 carbon atoms.

15. A fuel concentrate comprising from 30 to 90 weight percent of an inert stable oleophilic organic solvent and from 10 to 70 weight percent of a product produced by the process which comprises contacting at a temperature sufficient to cause reaction glycidol with an alkenyl or alkyl succinimide of the formula:

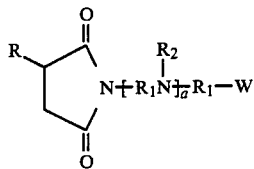

wherein R is an alkenyl or alkyl group containing from about 10 to 300 carbon atoms; $R_1$ is alkylene of 2 to 10 carbon atoms; $R_2$ is hydrogen or lower alkyl; a is an integer from 0 to 10; and W is $-NH_2$ or

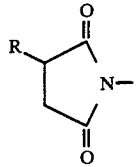

wherein R is an alkenyl or alkyl group containing from about 10 to 300 carbon atom; with the proviso that if W is

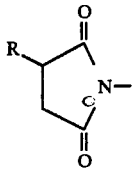

then a is not zero and at least one of $R_2$ is hydrogen and wherein the charge mole ratio ranges from greater than 1 and up to 10 of glycidol to each of the basic nitrogens of the alkenyl or alkyl succinimide.

16. A fuel concentrate as defined in claim 15 wherein R is an alkenyl or alkyl group of from 20 to 100 carbon atoms.

17. A fuel concentrate as defined in claim 16 wherein the process is conducted at from 0° to 250° C.

18. A fuel concentrate as defined in claim 17 wherein the charge mole ratio ranges from greater than 1 and up to 5 of glycidol to each of the basic nitrogens of the alkenyl or alkyl succinimide.

19. A fuel concentrate comprising from 30 to 90 weight percent of an inert stable oleophilic organic solvent and 10 to 70 weight percent of a product produced by the process which comprises:
(a) contacting at a temperature sufficient to cause reation an alkenyl or alkyl succinimide containing at least one primary or secondary amine with glycidol wherein the charge mole ratio ranges from greater than 1 and up to 10 of glycidol to each of the basic nitrogens of the alkenyl or alkyl succinimide; and
(b) reacating the adduct formed in (a) above with boric acid wherein from about 0.1 equivalents to 10 equivalents of boric acid are employed per equivalent of adduct produced in (a) above.

* * * * *